Senju et al.

[11] 3,880,831
[45] Apr. 29, 1975

[54] PROCESS OF PRODUCING CARBAMOYLALKYL DERIVATIVES OF HIGH MOLECULAR COMPOUNDS

[75] Inventors: Ryoichi Senju; Mitsuo Higuchi, both of Fukuoka, Japan

[73] Assignee: Ryoichi Senju, Fukuoka-shi, Japan

[22] Filed: Jan. 2, 1974

[21] Appl. No.: 430,242

[30] Foreign Application Priority Data
Jan. 18, 1973  Japan .................................. 48-8051

[52] U.S. Cl. ...... 260/232; 260/91.3 PV; 260/209 R; 260/231 A; 260/233.3 R
[51] Int. Cl... C08b 11/20; C08b 19/06; C08f 27/16
[58] Field of Search ........ 260/231 A, 232, 91.3 VA, 260/233.3 R, 209 R

[56] References Cited
UNITED STATES PATENTS

| | | | |
|---|---|---|---|
| 3,018,156 | 1/1962 | Bikales............................ | 260/231 A |
| 3,029,232 | 4/1962 | Bikales et al. ................... | 260/231 A |
| 3,199,943 | 8/1965 | Paulusma........................ | 260/231 A |
| 3,264,283 | 8/1966 | Jarowenko.................... | 260/233.3 R |
| 3,275,576 | 9/1966 | Flodin et al..................... | 260/231 A |
| 3,567,360 | 3/1971 | Pierce et al..................... | 260/231 A |

OTHER PUBLICATIONS

McAlpine et al., Qualitative Chemical Analysis, Van Nostrand Company, Inc., N.Y., N.Y., 1933, pp. 546–556.

*Primary Examiner*—Ronald W. Griffin
*Attorney, Agent, or Firm*—Bierman & Bierman

[57]  ABSTRACT

A carbamoylalkyl derivative of a high molecular compound is produced with a good yield and low cost by conducting the hydrolysis of a cyanoalkyl derivative of the high molecular compound with hydrogen peroxide in an alkaline state in the presence of iodine ions without accompanied by the reduction in the polymerization degree of the high molecular compound caused by the oxidative scission thereof by the action of nascent oxygen.

13 Claims, 3 Drawing Figures

PROCESS OF PRODUCING CARBAMOYLALKYL DERIVATIVES OF HIGH MOLECULAR COMPOUNDS

BACKGROUND OF THE INVENTION

1. Field of the Invention

The present invention relates to a process of producing a carbamoylalkyl derivative of a high molecular compound and more particularly, it relates to an improved process of producing a carbamoylalkyl derivative of a high molecular compound by hydrolyzing a cyanoalkyl derivative of the high molecular compound with hydrogen peroxide.

2. Description of the Prior Art

It is well known that a cyanoalkyl group be converted into a carbamoylalkyl group by treating the cyanoalkyl group with hydrogen peroxide in an alkaline state as shown in formula (1)

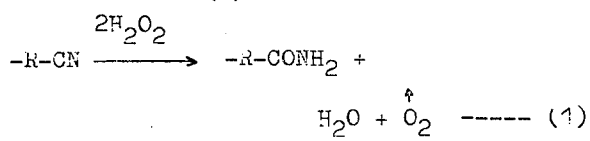

wherein R represents an alkyl group.

An application of this reaction to starch derivatives is disclosed in U.S. Pat. No. 3,264,283. However, when the aforesaid reaction is applied as it is to a cyanoalkyl derivative of a high molecular compound by ordinary manners as disclosed in the aforesaid patent, the high molecular compound suffers oxidative scission by nascent oxygen formed in the reaction and hence it is difficult to obtain a carbamoylalkyl derivative of the high molecular compound from the cyanoalkyl derivative thereof by the above-mentioned reaction without accompanied by the reduction in the polymerization degree of the high molecular compound.

That is, in the hydrolysis of a cyanoalkyl group by hydrogen peroxide, an oxygen gas is formed as shown in the abovementioned formula (1) and the nascent oxygen thus formed causes the oxidative scission of the high molecular compound. This is, in particular, a fatal phenomenon to the glucoside bond of polysaccharide since the glucoside bond is very scissile by the action of nascent oxygen in an alkaline state. Therefore, it is difficult to convert the cyanoalkyl derivative of a polysaccharide such as starch and cellulose to the carbamoylalkyl derivative thereof without lowering the polymerization degree of the polysaccharide by hydrolyzing the cyanoalkyl derivative with hydrogen peroxide by such a conventional manner since in such a case the oxidative scission of the glucoside bond of the polysaccharide occurs. This is true in the case of hydrolyzing a cyanoalkylated product of polyvinyl alcohol, that is, it is difficult, in this case, to avoid the reduction of polymerization degree of polyvinyl alcohol.

SUMMARY OF THE INVENTION

As the results of various investigations of preventing the occurence of the oxidative scission of such high molecular compounds, the inventors have discovered that the occurence of the oxidative scission is prevented by presenting iodine ions in the reaction system, and based on this discovery the inventors have succeeded in obtaining the process of this invention.

An object of this invention is, therefore, to provide a process of producing a carbamoylalkyl derivative of a high molecular compound by the hydrolysis of a cyanoalkyl derivative of the high molecular compound with hydrogen peroxide without accompanied by the oxidative scission of the said compound with nascent oxygen.

Other object of this invention is to provide a process of producing a carbamoylalkyl derivative of a high molecular compound with a high yield and low cost.

Those objects of this invention can be attained by conducting the hydrolysis of a cyanoalkyl derivative of a high molecular compound with hydrogen peroxide in an alkaline state in the presence of iodine ions.

Thus, according to the present invention there is provided a process of producing a carbamoylalkyl derivative of a high molecular compound which comprises hydrolyzing a cyanoalkyl derivative of the high molecular compound with hydrogen peroxide in an alkaline state in the presence of iodine ions.

By the process of this invention the carbamoylalkyl derivative of a high molecular compound can be obtained with a high yield and low cost without lowering the polymerization degree of the high molecular compound.

BRIEF DESCRIPTION OF THE DRAWINGS

In the accompanying drawings.

DETAILED DESCRIPTION OF THE INVENTION

The process of this invention is conducted in an alkaline state of ordinary pH 8–13, preferably pH 9–12 and a proper reaction temperature is generally lower than 40°C., preferably 10°–30°C. The concentration of the iodine ions is usually higher than 0.002 mol/liter, preferably about 0.01 to about 0.1 mol/liter.

Hydrogen peroxide causes the reaction almost quantitatively in a homogeneous system and hence in order to convert all the cyanoalkyl groups to carbamoylalkyl groups, hydrogen peroxide is used in an amount of more than twice the amount of the cyanoalkyl group as will be understood from above-mentioned formula (1) There are no particular limitations about the concentration of hydrogen peroxide in the reaction system but the concentration thereof at the practice of the reaction is usually 0.001–5.0 mol/liter, preferably 0.01–0. mol/liter.

Figure 1:
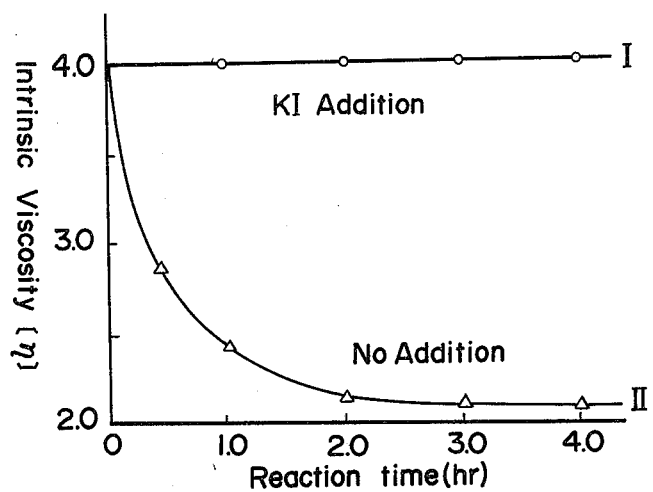
FIG. 1 is a graph showing the course of the oxidative scission of cyanoethyl cellulose with hydrogen peroxide in an alkaline state.

Now, the process of this invention will further be explained in detail by referring to the accompanying drawings. That is, the graph of FIG. 1 shows the course of the oxidative scission of cyanoethyl cellulose by hydrogen peroxide in an alkaline state when the hydrolsis was conducted in an aqueous system containing 0.50% by weight cyanoethyl cellulose, 0.05 mol/liter sodium hydroxide and 0.10 mol/liter of hydrogen peroxide in the absence or the presence of 0.01 mol/liter of potassium iodide at 20°C. and at pH 11.5. Namely the results shown in the graph were obtained by measuring the change in viscosity of the above-mentioned aqueous reaction system by means of an Ostwald's v cometer in the case of adding potassium iodide to the reaction system (Curve I) and in the case of adding no iodide (Curve II).

As shown in the graph, in the case of adding no iodide, the intrinsic viscosity of the reaction system decreased from 4.0 to 3.0 after 30 minutes and to almost 2.0 after 2 hours, which showed that the polymer in the reaction system lost the properties as polymer. On the other hand, in the case of adding potassium iodide, no reduction in viscosity was observed even after 4 hours.

Figure 2:
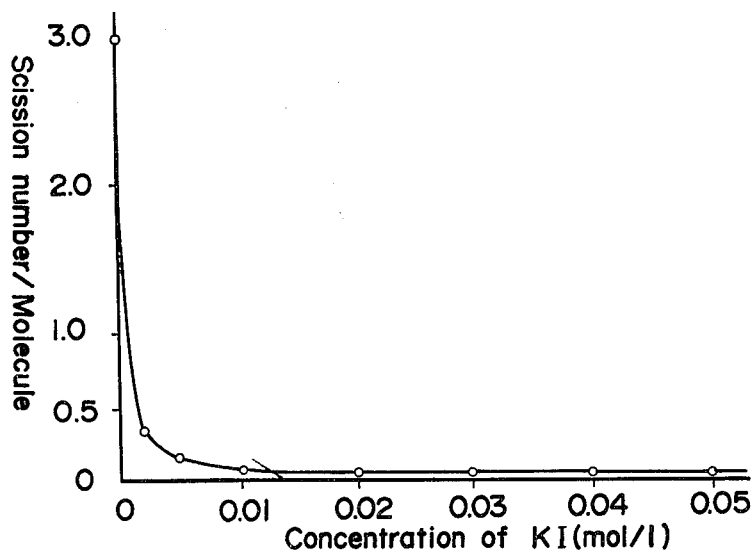
FIG. 2 is a graph showing the relation between the scission number of the molecule of cyanoethyl cellulose and the concentration of potassium iodide.

Also, the states of the oxidative scission of cyanoethyl cellulose when the hydrolysis as above was conducted at various concentrations of iodine ions are illustrated in the graph of FIG. 2. That is, the graph of FIG. 2 shows the relation between the scission number of the cyanoethyl cellulose molecule and the concentration of potassium iodide when the hydrolysis of cyanoethyl cellulose was conducted in an aqueous reaction system containing 0.50% by weight cyanoethyl cellulose, 0.05 mol/liter of sodium hydroxide, and 0.10 mol/liter of hydrogen peroxide in the presence of potassium iodide for 60 minutes at 20°C. and at pH 11.5. The scission number per molecule shown in FIG. 2 was obtained from the reduction in viscosity of solution by the formula of Sakurada and Okamura, "Kogyo Kagaku Zasshi (Journal of Industrial Chemistry)"; Vol. 45, 1101 (1942).

As clear from the results shown in FIG. 2, when the reaction system contained no potassium iodide (corresponding to the zero concentration of KI), the scission number of cyanoethyl cellulose was 3 per molecule, which showed the loss of the properties as polymer, while when potassium iodide was added to the reaction system in a concentration of only 0.005 mol/liter, the scission number of the molecule could be reduced to 0.2 and further when it was added in a concentration of 0.01 mol/liter, the oxidative scission of cyanoethyl cellulose could almost completely be prevented.

Since the influence of the scission of the main chain of a molecule of polymer on the solution properties of the polymer is quite severe, the effect of the addition of iodine ions according to the present invention is quite remarkable.

Figure 3:
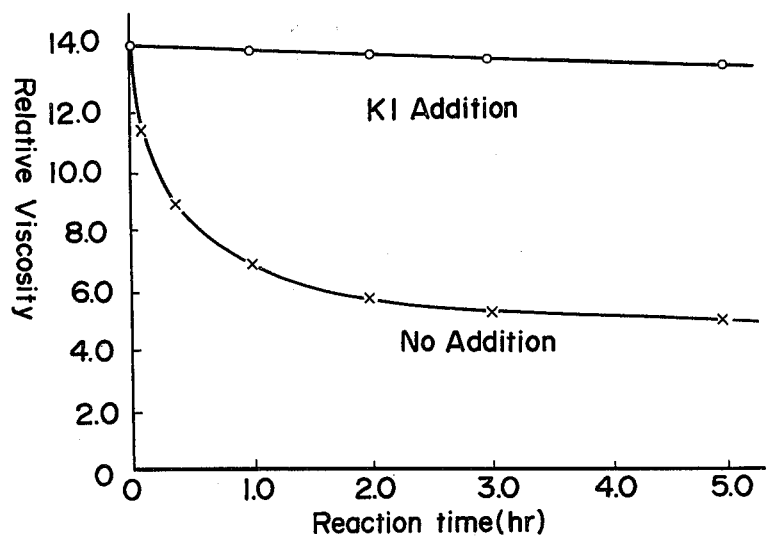
FIG. 3 is a graph showing the course of the oxidative scission of cyanoethyl polyvinyl alcohol with hydrogen peroxide in an alkaline state.

The graph of FIG. 3 shows the influence of iodine ions on the oxidative scission of the main chain of cyanoethyl polyvinyl alcohol in the hydrolysis thereof with hydrogen peroxide in an alkaline state when the hydrolysis was conducted in an aqueous reaction system containing 3.8% by weight (0.27 mol/liter) of cyanoethyl polyvinyl alcohol having a substitution degree of 0.50, 0.10 mol/liter of sodium hydroxide, and 0.6 mol/liter of hydrogen peroxide in the absence of potassium iodide or in the presence of 0.01 mol/liter of potassium iodide at 25°C. and at pH 10.9. The relative viscosity of the reaction system was plotted per definite period of time. As clear from the results shown in FIG. 3, the viscosity of the reaction system scarecely varied when potassium iodide was added while the viscosity reduced to half of the original value after one hour when no potassium iodide was added.

In the process of this invention, not only sodium iodide or potassium iodide but also iodine or iodine-potassium iodide can be used as the source of iodine ions effectively since iodine is dissolved in an alkaline aqueous solution to give iodine ions.

In addition, it is an important phenomenon in the case of carbamoylalkylating a cyanoalkyl derivative of a high molecular compound that the carbamoylalkyl group formed is released gradually in an alkaline state. Therefore, in order to prevent the occurence of the above phenomenon, it is required to add hydrogen peroxide in slightly excessive and then to neutralize the reaction product immediately after the reaction was over to acidify the reaction product. In this case, the iodine ions contribute to make ineffective the remaining hydrogen peroxide by decomposing it. A large amount of iodine ions may of course be used in the process of this invention but since the addition of iodine ions gives the sufficient effect even in a small amount as mentioned above, the proper amount thereof is more than 0.002 mol/liter, preferably 0.005–0.1 mol/liter from an economical view point.

Now, when the nitrogen of the carbamoylalkyl derivative of the high molecular compound prepared by the process of this invention is halogenized by a hypohalite, the product can be used as excellent paper reinforcing agents and adhesives. Furthermore, when the N-halogenated product of the derivative is heated in an alkaline state, high molecular polyamines which are very important in industrial purposes are formed. Therefore, the process of this invention capable of producing the carbamoyl derivatives of high molecular compounds with a good yield and low cost has quite large merit.

Then, the invention will further be explained more practically by referring to the following examples, in which all percent is percent by weight.

EXAMPLE 1

To 2,000 ml. of 1.0% aqueous sodium hydroxide solution of 8.0% cyanoethyl cellulose having substitution degree of 0.5 was added 3.32 g. (0.02 mol) of potassium iodide (concentration of KI 0.01 mol/liter). While cooling the mixture from outside, 110 ml. of 30% hydrogen peroxide solution was added to the mixture in few steps with stirring well. The pH of the reaction system was 10.3. The carbamoylethylation proceeded while generating oxygen gas but no reduction in viscosity of the reaction system was observed. After about 1 hour the addition of hydrogen peroxide was finished.

After the reaction was over, the reaction product was neutralized with acetic acid and then allowed to stand for 2–3 hours, whereby remaining hydrogen peroxide was decomposed.

By estimating the carbamoylethyl group of the product (after chlorinating the product with sodium hypochlorite, the available chlorine was determined by iodometeric titration), the degree of substitution was confirmed to be 0.50, which showed the reaction yield being 100%.

EXAMPLE 2

To 2,000 ml. of 1.0% aqueous sodium hydroxide solution of 25% cyanoethyl starch having a substitution degree of 0.50 was added 3.74 g. (0.02 mol) of iodine with stirring well. The concentration of iodine was 0.01 mol/liter. Then, while cooling the mixture from outside, 300 ml. of 30% hydrogen peroxide solution was added to the mixture in few steps. In this case, the pH of the reaction system was 10.3. Oxygen gas generated vigorously but no reduction in the viscosity of the aqueous reaction system was observed. The reaction ceased after about 60 minutes.

After the reaction was over, the reaction product was neutralized with acetic acid to decompose off remaining hydrogen peroxide. By estimating the carbamoylethyl group of the product by iodometric titration as in Example 1, the degree of substitution was confirmed to be 0.50, which showed the reaction yield being 100%.

EXAMPLE 3

In 50 ml. of 1.0% aqueous sodium hydroxide solution was dissolved 10 g. of cyanoethyl polyvinyl alcohol having a substitution degree of 0.50 and then 0.083 g (0.0005 mol) of potassium iodide was added to the solution. The concentration of potassium iodide was 0.01 mol/liter. Thereafter, 20 ml. of 30% hydrogen peroxide solution was added to the mixture. The pH of the reaction system was 10.2. Oxygen gas generated but no reduction in viscosity of the reaction system was observed. The reaction ceased after about 60 minutes. Then, after removing remaining hydrogen peroxide, the carbamoylethyl group of the product was estimated as in Examples 1 and 2. Thus, the degree of substitution was confirmed to be 0.50, which showed the reaction yield being 100%.

EXAMPLE 4

To 200 ml. of 1% hydrogen peroxide solution was added a solution prepared by dissolving 0.332 gg. (0.002 mol) of potassium iodide and 2.0 g. of sodium hydroxide in 10 ml. of water (the concentration of KI was 0.01 mol/liter) and then 20 g. of cyanoethylated cellulose pulp having a substitution degree of 0.02 was immersed in the resultant solution. The pH of the reaction system was 11.6. After reacting the reaction system for 60 minutes at 20°C., the reaction product was washed with water and dried. By estimating the carbamoylethyl group about a part of the pulp thus treated by the method as in Example 1, the degree of substitution was confirmed to be 0.02, which showed the reaction yield being 100%.

EXAMPLE 5

In 10 ml. of 25% aqueous sodium sulfate solution containing 0.8% sodium hydroxide was suspended granular cyanoethyl starch with or without the addition of 16.6 mg. of potassium iodide. Then, after adding to the suspension a definite amount of hydrogen peroxide, the reaction system was reacted at 20°C. for a definite period of time. After the reaction was over, the reaction product was neutralized, filtered, washed with methanol, and dried to provide carbamoylethyl starch.

By estimating the carbamoylethyl group of the product as in Example 1, the degree of carbamoylethylation (reaction yield) was determined. Also, 2.0% aqueous solution of the product was prepared under heating and then the relative viscosity of the solution was measured by means of an Ostwald's viscometer. The results obtained are shown in the following table.

In addition, the reaction conditions employed above were as follows:

Cyanoethyl starch having substitution degree of 0.52: 2.02 g. (5.47 m. mol as cyanoethyl group).
30% Hydrogen peroxide solution:
2.0 g. (17.6 m. mol, 3.1 mol times of cyanoethyl group).
Potassium iodide: none or added (0.01 mol/liter).
pH: 10.2
Reaction period of time: 16 hours.

Table 1

|  | KI added | none |
|---|---|---|
| Amount of CBS+ obtained | 2.11 g. | 1.63 g. |
| Yield of CBS " | 99.7% | 77.0% |
| Degree of carbamoylethylation | 98.0% | 95.0% |
| Relative viscosity | 14.0 | 1.66 |

+CBS: Carbamoylethyl starch

As clear from the results shown in Table 1, even in the heterogeneous reaction of granular cyanoethyl starch, the starch molecules suffered oxidative scission when iodine ions were not present in the system, which resulted in reducing the yield for the product and the viscosity of the reaction system. The reduction in yield is considered to be caused by that carbamoylethyl starch suffered the oxidative scission and a part of it was dissolved off in 25% aqueous sodium sulfate solution.

EXAMPLE 6

The same procedure as in Example 5 was repeated about granular cyanoethyl starch having a comparatively low degree of substitution, the results of which are shown in Table 2.

In addition, the reaction conditions employed in this example were as follows:

Cyanoethyl starch having a substitution degree of 0.25:
4.4 g. (6.27 m. mol as cyanoethyl group).
30% Hydrogen peroxide:
1.5 g. (15.0 m. mol, 2.39 mol times of cyanoethyl group).
Potassium iodide: none or added (0.01 mol/liter).
pH: 10.5
Reaction period of time: 2 hours.

Table 2

|  | KI added | none |
|---|---|---|
| Amount of CBS obtained | 4.48 g. | 3.96 g |
| Yield for CBS " | 98.0% | 88.0% |
| Degree of carbamoylethylation | 97.0% | 93.5% |
| Relative viscosity | 15.5 | 4.0 |

As clear from Table 2, although the reaction period of time was short, the relative viscosity of the reaction system reduced greatly when iodine ions were not added to the system.

The effect of the addition of iodine ions was clearly observed about the yields for the products.

What is claimed is:

1. A process of producing a carbamoylalkyl derivative of a high molecular compound which comprises hydrolyzing a cyanoalkyl derivative of the high molecular compound with hydrogen peroxide in an alkaline state in the presence of iodine ions.

2. The process as claimed in claim 1 wherein said high molecular compound is a polysaccharide.

3. The process as claimed in claim 2 wherein said polysaccharide is cellulose.

4. The process as claimed in claim 2 wherein said polysaccharide is starch.

5. The process as claimed in claim 1 wherein said high molecular compound is polyvinyl alcohol.

6. The process as claimed in claim 1 wherein said iodine ions are present in the reaction system in a concentration of higher than 0.002 mol/liter.

7. The process as claimed in claim 1 wherein said iodine ions are present in the reaction system in a concentration of 0.01–0.1 mol/liter.

8. The process as claimed in claim 1 wherein the pH of the reaction system is 8–13.

9. The process as claimed in claim 1 wherein the pH of the reaction system is 9–12.

10. The process as claimed in claim 1 wherein the amount of hydrogen peroxide is higher than 2 mol times the amount of the cyanoalkyl group of the high molecular compound.

11. The process as claimed in claim 1 wherein the reaction temperature is lower than 40°C.

12. The process as claimed in claim 1 wherein the reaction temperature is 10°–30°C.

13. The process as claimed in claim 1 wherein said iodine ions are supplied to the reaction system as potassium iodide, sodium iodide, or iodine.

* * * * *